(12) United States Patent
Häggström et al.

(10) Patent No.: US 10,315,514 B2
(45) Date of Patent: Jun. 11, 2019

(54) GEARBOX WITH A PTO CLUTCH WITH INTEGRATED SHAFT BRAKE

(71) Applicant: Scania CV AB, Södertälje (SE)

(72) Inventors: Daniel Häggström, Södertälje (SE); Peer Norberg, Södertälje (SE)

(73) Assignee: SCANIA CV AB, Södertälje (SE)

( * ) Notice: Subject to any disclaimer, the term of this patent is extended or adjusted under 35 U.S.C. 154(b) by 124 days.

(21) Appl. No.: 15/527,959

(22) PCT Filed: Dec. 1, 2015

(86) PCT No.: PCT/SE2015/051291
§ 371 (c)(1),
(2) Date: May 18, 2017

(87) PCT Pub. No.: WO2016/093761
PCT Pub. Date: Jun. 16, 2016

(65) Prior Publication Data
US 2017/0361706 A1    Dec. 21, 2017

(30) Foreign Application Priority Data
Dec. 10, 2014  (SE) ...................... 1451511

(51) Int. Cl.
*B60K 17/28*  (2006.01)
*F16H 37/04*  (2006.01)
(Continued)

(52) U.S. Cl.
CPC ............. *B60K 17/28* (2013.01); *F16H 3/091* (2013.01); *F16H 37/046* (2013.01); *F16D 13/52* (2013.01);
(Continued)

(58) Field of Classification Search
CPC ....... B60K 17/28; F16H 3/091; F16H 37/046; F16H 2200/2005; F16H 2200/006; F16D 13/52
See application file for complete search history.

(56) References Cited

U.S. PATENT DOCUMENTS 3,065,643 A     12/1899  Mark et al.
3,774,474 A *   11/1973  Recker ................. F16H 37/046
                                                                475/209
(Continued)

FOREIGN PATENT DOCUMENTS

DE     1037277 B     8/1958
DE     2166568       8/1958
(Continued)

OTHER PUBLICATIONS

Korean Office Action for Korean Patent Application No. 10-2017-7017609 dated May 14, 2018.
(Continued)

*Primary Examiner* — Paul N Dickson
*Assistant Examiner* — Timothy Wilhelm
(74) *Attorney, Agent, or Firm* — Moore & Van Allen PLLC; W. Kevin Ransom (57) ABSTRACT

The present invention relates to a device for a gearbox which comprises a main shaft, a counter shaft, a plurality of gearwheel pairs each comprises a primary gearwheel arranged on the counter shaft and a secondary gearwheel arranged on the main shaft and a PTO shaft. The device comprises a switch mechanism movably arranged to a first position in which the PTO shaft is disconnected from the counter shaft in a non-rotatable state, to a second position in which the PTO shaft is rotationally fixedly connected to the counter shaft, and to a neutral position in which the PTO shaft is in a rotatable state and disconnected from the counter shaft. The device comprises further a clutch mechanism able (Continued)

to provide a clutching connection between the counter shaft and the PTO shaft when the switch mechanism is in the first position and in the neutral position.

20 Claims, 4 Drawing Sheets

(51) Int. Cl.
*F16H 3/091* (2006.01)
*F16D 13/52* (2006.01)

(52) U.S. Cl.
CPC .................. *F16H 2200/006* (2013.01); *F16H 2200/2005* (2013.01)

(56) References Cited

U.S. PATENT DOCUMENTS

| | | | | |
|---|---|---|---|---|
| 4,485,692 A * | 12/1984 | Moore | ................. | F16H 3/0915 74/369 |
| 4,498,356 A * | 2/1985 | Vater | ................. | B60K 17/344 74/15.63 |
| 4,686,869 A * | 8/1987 | Beim | ................. | F16H 37/042 74/356 |
| 4,782,714 A * | 11/1988 | Schletzbaum | ......... | F16H 3/093 74/331 |
| 4,882,951 A * | 11/1989 | Braun | ................. | B60K 17/04 74/745 |
| 6,530,290 B2 * | 3/2003 | Matsufuji | ............... | F16H 59/02 74/335 |
| 6,601,474 B2 * | 8/2003 | Ishimaru | ............. | B60K 17/105 180/247 |
| 7,303,498 B2 * | 12/2007 | Ishii | ....................... | B60K 17/28 475/72 |
| 8,033,298 B2 * | 10/2011 | Matsufuji | ............. | B60K 17/28 137/343 |
| 8,517,139 B2 * | 8/2013 | Komatsu | ................ | B60K 17/08 180/233 |
| 8,944,193 B2 * | 2/2015 | Sagawa | .................. | B60K 17/28 180/53.6 |
| 9,475,384 B2 * | 10/2016 | Matsuura | ............ | B60K 17/105 |
| 2005/0241423 A1 | 11/2005 | Muetzel et al. | | |
| 2006/0241840 A1 | 10/2006 | Steen et al. | | |
| 2014/0165748 A1 | 6/2014 | Alford et al. | | |

FOREIGN PATENT DOCUMENTS

| | | |
|---|---|---|
| GB | 2142101 A | 1/1985 |
| WO | 8802320 A1 | 4/1988 |
| WO | WO2005058629 A1 | 6/2005 |
| WO | WO2010123436 | 6/2005 |

OTHER PUBLICATIONS

International Preliminary Report on Patentability for International Patent Application No. PCT/SE2015/051291 dated Jun. 13, 2017.
International Search Report for PCT/SE2015/051291 dated Jul. 3, 2016.
Written Opinion of the International Searching Authority for PCT/SE2015/051291 dated Jul. 3, 2016.
European Search Report from the European Patent Office for PCT/SE2015/051291 dated Oct. 15, 2018.

* cited by examiner

GEARBOX WITH A PTO CLUTCH WITH INTEGRATED SHAFT BRAKE

CROSS-REFERENCE TO RELATED APPLICATION(S)

This application is a national stage application (filed under 35 § U.S.C. 371) of PCT/SE15/051291, filed Dec. 1, 2015 of the same title, which, in turn claims priority to Swedish Application No. 1451511-8 filed Dec. 10, 2014 of the same title; the contents of each of which are hereby incorporated by reference.

FIELD OF THE INVENTION

The invention relates to a device for a gearbox, where the device is configured to act as counter shaft brake as well as a synchronizing unit for a PTO.

BACKGROUND OF THE INVENTION

Conventional gearboxes comprise a main shaft, a counter shaft, a plurality of gearwheel pairs each comprising a primary gearwheel fixedly arranged on the countershaft and a secondary gearwheel rotatably arranged on the main shaft. The primary gearwheel and the secondary gearwheel of the gearwheel pairs are constantly in meshing engagement with each other. The main shaft may support synchronizing units arranged at the vicinity of the secondary gearwheels of the respective gearwheel pairs. The synchronizing units are used to synchronize and lock the secondary gearwheels on the main shaft when a gear is to be engaged in the gearbox. The synchronizing units comprises friction surfaces which are moved into contact with each other when the speed of a secondary gearwheel is to be synchronized with the speed of the main shaft. The friction surfaces of the synchronization units are exposed to heavy loads and risk wear related problems.

An alternative to synchronizing units, it is to use a brake which reduces the speed of the counter shaft during an upshift process. Such a brake reduces the speed of the counter shaft until a secondary gearwheel receives a synchronous speed with the main shaft whereupon a locking unit provides a rotational locking of the secondary gear on the main shaft. During a downshift process, a drive motor provides an acceleration of the counter shaft, via an input shaft to the gearbox, until the secondary gearwheel receives a synchronous speed with the main shaft whereupon a lock unit provides a rotational locking of the secondary gear on the main shaft.

Gearboxes of heavy vehicles are often provided with a PTO (Power Take-Off).

The PTO may comprise a shaft which, at one end, is connectable to the counter shaft in the gearbox. The PTO shaft is at an opposite end connected to a power take-off connection usually arranged on the same side of the gearbox as the output shaft of the gearbox. It is many times desired to use the PTO when the vehicle is moving. However, it is not possible to shift gear in the gearbox when the PTO is connected to the counter shaft due to high torque or inertia of the engaged PTO. In a simple kind of PTO, the PTO shaft is to be connected to the counter shaft when the vehicle is stationary. In this kind of PTO, it is only possible to use the PTO with the start gear in the gearbox. In a more advanced PTO, it is possible to accelerate the vehicle to the speed at which the PTO is to be used. Thereafter, the speed of the PTO shaft and the counter shaft is synchronized by some kind of synchronizing unit whereupon the PTO shaft is connected to the counter shaft. In this case, it is possible to use the PTO with a higher gear in the gearbox.

SUMMARY OF THE INVENTION

The object of the present invention is to provide a device for a gearbox configured to act as counter shaft brake as well as a synchronizing unit for a PTO which includes fewer components than a separate counter shaft brake and a separate coupling unit for a PTO.

The above mentioned object is achieved by a device that comprises a switch mechanism settable in a first position, a second position and a neutral position and a clutch mechanism by which it is possible to provide a clutching connection between the counter shaft and the PTO. When the switch mechanism is set in the first position, it locks the PTO shaft in a non-rotational state. In the first position, the PTO is in an inactive state. In case the clutch mechanism is activated in the first position and establishes a clutching connection between the counter shaft and the PTO shaft, the rotary speed of the counter shaft will be braked by the stationary PTO shaft. Consequently, it is possible to use the clutch mechanism as a counter shaft brake which reduces the speed of the counter shaft during upshift processes in the gearbox.

When the switch mechanism is set in the second position, it provides a rotationally fixed connection between PTO shaft and the counter shaft such that the PTO shaft is driven with the same speed as the counter shaft. In the second position, the PTO is in an active state. The switch mechanism is also able to be set in a neutral position, in which the PTO shaft is able to rotate freely in relation to the counter shaft. In case the clutch mechanism is activated in the neutral position and establishes a clutching connection between the counter shaft and the PTO shaft, the PTO shaft will be accelerated by the counter shaft. When the PTO shaft has reached a synchronous speed with the counter shaft, it is possible to move the switch mechanism to the second position in which the PTO shaft and the counter shaft are rotationally locked together. Thus, it is possible to use the same clutch mechanism as a counter shaft brake when the switch mechanism is in the first position as well as a synchronizing unit which synchronizes the speed of the PTO shaft with the speed of counter shaft when the switch mechanism is in the first position. Since the clutch mechanism has dual functions, the device includes fewer component than a separate counter shaft brake and a separate synchronizing and coupling unit for a PTO.

According to an embodiment of the invention, device is arranged in an area in the vicinity of an end portion of the counter shaft and an end portion of the PTO shaft. In order to establish a clutching connection between the counter shaft and the PTO shaft, it is necessary to arrange the clutch mechanism in an area located close to a part of the counter shaft and close to a part of the PTO shaft. An end portion of the counter shaft and an end portion of the PTO shaft are usually arranged in an area in the vicinity of each other in a gearbox. Thus, it is suitable to arrange the device in such an area. The device may be arranged in an area in the vicinity of the end portions of a counter shaft and a PTO shaft which are coaxially arranged in the gearbox. In such an area, it is possible to design a switch mechanism and a clutch mechanism taking up a relatively small space.

According to an embodiment of the invention, the clutch mechanism comprises at least one primary friction disc rotationally fixedly connected to the counter shaft and at least one secondary friction discs rotationally fixedly connected to the PTO shaft and a clutch actuator configured to move the primary friction disc and the secondary friction disc against each other. Such a clutch mechanism has a relatively simple design. Preferably, the primary friction disc and/or the secondary friction disc are movably arranged in an axial direction in relation to their respective axes. In this case, it is easy to move the friction discs to contact with each other. The clutch mechanism may comprise several primary friction discs and several secondary friction discs. The primary friction discs and the secondary friction discs may be arranged in parallel in a row in which every other friction disc is a primary friction disc and every secondary friction disc is a secondary friction disc.

According to an embodiment of the invention, the switch mechanism comprises a coupling sleeve which is movably arranged in an axial direction to said three positions. The coupling sleeve may be moved to said three positions by means of a pneumatic actuator controlled by a control unit. Said coupling sleeve may be rotationally fixedly connected to the PTO shaft via a first component. Thus the coupling sleeve rotates with the same speed as the PTO shaft. Said first component may be a coupling disc rotationally fixedly connected to the PTO shaft and provided with a teeth portion at an outer periphery to be in engagement with a teeth portion of the coupling sleeve. The teeth portion of the coupling sleeve and the teeth portion of the coupling disc comprise axially directed teeth allowing an axial movement of the coupling sleeve in relation to the PTO shaft.

According to an embodiment of the invention, the coupling sleeve may, in said first position, provide a rotationally fixed connection between said first component and a second stationary component in the gearbox. Thus, the coupling sleeve connects the PTO shaft, via the first component, to the stationary component in the gear box. This rotationally fixed connection between the PTO shaft and the stationary component in the gearbox prevents rotational movements of the PTO shaft when the switch mechanism is in the first position. Thus, the PTO is in an inactive state in the first position. The stationary component may be a stationary wall in the gearbox provided with a teeth portion to be engageable with the teeth portion of the coupling sleeve. By means of such a stationary teeth portions, it is easy to establish a rotationally fixed connection between PTO shaft and the stationary wall.

According to an embodiment of the invention, said coupling sleeve provides, in said second position, a rotationally fixed connection between the first component and a third component which is rotationally fixedly connected to the counter shaft. Thus, the coupling sleeve establishes a rotationally fixed connection between the PTO shaft and the counter shaft via said components. The third component may be a support member for the primary friction disc which is provided with a teeth portion at an outer periphery to be engageable with a teeth portion of the coupling sleeve. Preferably, the teeth portions of the first component, the second component and the third component are arranged at the same radial distance from a rotary axis of the PTO shaft. Thereby, it is possible to use one and the same teeth portion of the coupling sleeve to be in engagement with the teeth portions of the first, second and third components in suitable combinations in the first position, the second position and the neutral position.

According to an embodiment of the invention, said coupling sleeve is, in the neutral position, rotationally fixedly connected to the PTO shaft and disconnected from the counter shaft and the stationary component. Thus, the PTO shaft is free to rotate in relation to the stationary component and the counter shaft as long as the clutch mechanism is in an inactive state. When the clutch mechanism is activated, the friction discs establish a clutching connection between the PTO shaft and the counter shaft. The counter shaft accelerates the speed of the PTO shaft. When they have reached a synchronous speed, the coupling sleeve is moved to the second position in which it establishes a rotationally fixed connection between the PTO shaft and the counter shaft.

According to an embodiment of the invention, said first component is arranged between said second stationary component in the gearbox and said third component. In this case, the coupling sleeve may be movably arranged to an axial end position corresponding to the first position in which the coupling sleeve establishes a rotationally fixed connection between the first component and the second stationary component. The coupling sleeve may be moveably arranged to an opposite axial end position corresponding to the second position in which the coupling sleeve establishes a rotationally fixed connection between the first component and the third component. Finally, the coupling sleeve may be movable to intermediate position in which the coupling sleeve only is in engagement with the first component.

According to an embodiment of the invention, the coupling sleeve is arranged between the friction discs and the clutch actuator. In this case, the actuator provides an axially movement which is transmitted, via the coupling sleeve, to the friction discs. Thus, the coupling sleeve is to be movably arranged in an axial direction on the PTO shaft. The coupling disc, which is rotationally fixedly connected to the PTO shaft, may be designed as a secondary friction disc which comes into contact with a primary friction disc of the counter shaft.

BRIEF DESCRIPTION OF THE DRAWINGS

In the following, a preferred embodiment of the invention is described as an example with reference to the attached drawings, on which.

DETAILED DESCRIPTION OF THE INVENTION

Figure 1:
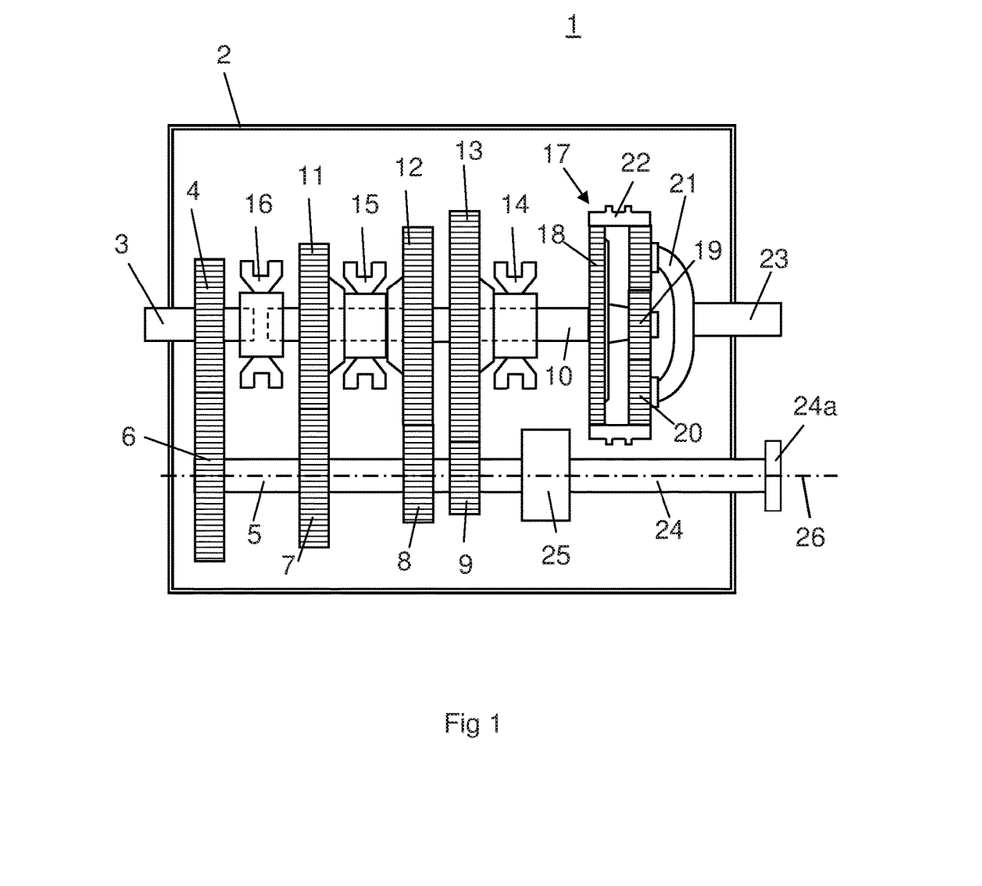
FIG. 1 shows a gearbox comprising an device according to the invention.

FIG. 1 shows a gearbox 2 in a vehicle 1. The vehicle 1 can be a heavy vehicle. The gearbox 2 comprises a housing and an input shaft 3 driven by a not shown engine. The input shaft 3 is provided with a gearwheel 4 on the inside of the gearbox 2. The gearbox 2 comprises a counter shaft 5 provided with a plurality of gearwheels 6-9 of different sizes. The gearwheel 4 of the input shaft 3 is continuously in meshing engagement with a gearwheel 6 of the countershaft 5 in the gearbox 2.

The gearwheels 6-9 are fixedly mounted on the counter shaft 5. The gearbox 2 comprises a main shaft 10 provided with a plurality of gearwheels 11-13 of different sizes. Each gearwheel 7-9 on the counter shaft 5 is in constant meshing engagement with a gearwheel 11-13 on the main shaft 10 such they form a number of gearwheel pairs in the gearbox 2. Each gearwheel pair includes a primary gearwheel 7-9 fixedly attached on the counter shaft 5 and secondary gear wheel 11-13 rotatably arranged on the main shaft 10.

A first lock unit 14 enables the establishment of a rotationally fixed connection between the secondary gearwheel 13 and the main shaft 10. When this connection is established, the torque in the gearbox is transmitted via the gearwheel pair 9, 13 which define a ratio corresponding to a first gear in the gearbox 2. A second double-acting lock unit 15 enables the establishment of a rotationally fixed connection between the secondary gearwheel 12 and the main shaft 10. When this connection is established, the torque in the gearbox is transmitted via the gearwheel pair 8, 12 which define a ratio corresponding to a second gear in the gearbox 2. The second lock unit 15 also enables the establishment of a rotationally fixed connection between the gearwheel 11 and the main shaft 10. When this connection is established, the torque in the gearbox is transmitted via the gearwheel pair 7, 11 which define a ratio corresponding to a third gear in the gearbox 2. A third lock unit 16 enables the establishment of a rotationally fixed connection between the input shaft 3 and the main shaft 10. In this case, a direct gear is established between the input shaft 3 and the main shaft in which the speed of the input shaft 3 is transmitted unchanged to the main shaft 10. This direct-gear corresponds to a fourth gear in the gearbox.

The gearbox 2 is provided with a range gear 17 in the form of a planetary gear. The main shaft 10 is provided with a coupling member 18 having external teeth and a sun gear 19. The sun gear 19 has external teeth in meshing engagement with a number of toothed planetary wheel 20. The planetary wheels 20 are carried by a planetary carrier 21. A second, non-shown coupling member, which is provided with external teeth is arranged in a stationary wall of the gearbox 2. A coupling ring 22 with internal teeth is arranged for movement in an axial direction by means of a power actuator. A planetary carrier 21 is fixedly arranged on an output shaft 23 from the gearbox 2. By means of the range gear 17, all ordinary gears in the gearbox 2 can be provided with a high range gear or a low range gear. Thus, the range gear 17 provides the gearbox 2 with twice as many gears. The gearbox 2 is provided with a PTO (Power Take-Off). The PTO comprises a PTO shaft 24 coaxially arranged in relation to the counter shaft 5. The counter shaft 5 and the PTO shaft 24 rotates around a common rotary axis 26. A device 25 according to the present invention is arranged in an area located in the vicinity of an end of the counter shaft 5 and an end of the PTO shaft 24. The PTO shaft 24 comprises at an opposite end a coupling plate 24a which may be connected to, for example, a hydraulic pump which drives an application such as an attached implement or separate machine.

Figure 2:
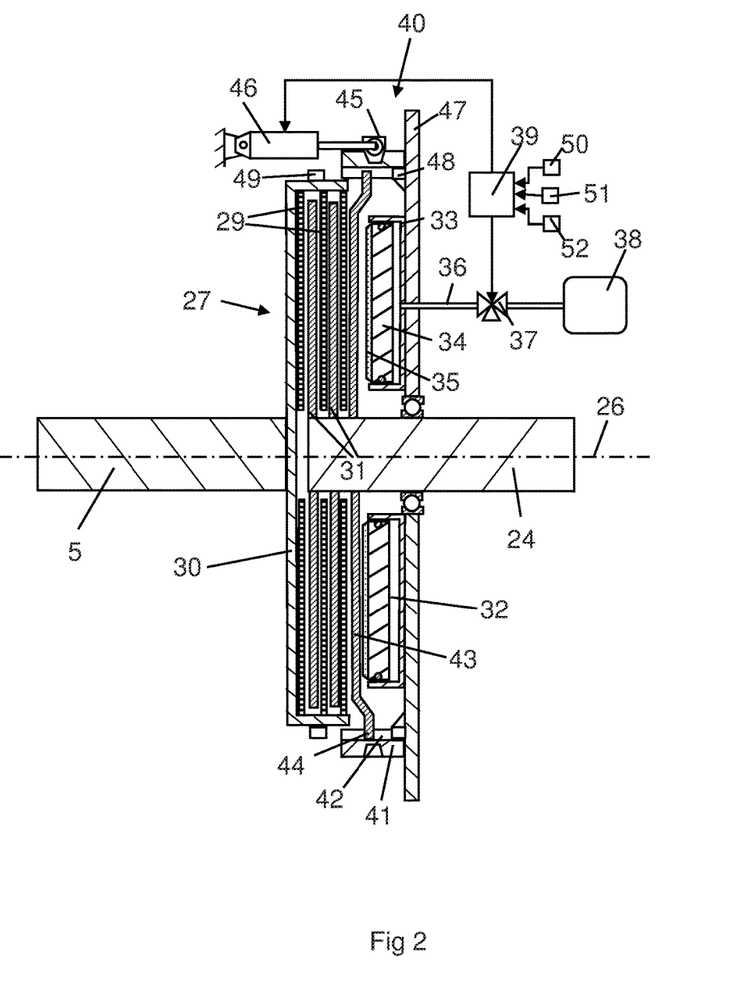
FIG. 2 shows the device when a switch mechanism is in a first position.
Figure 3:
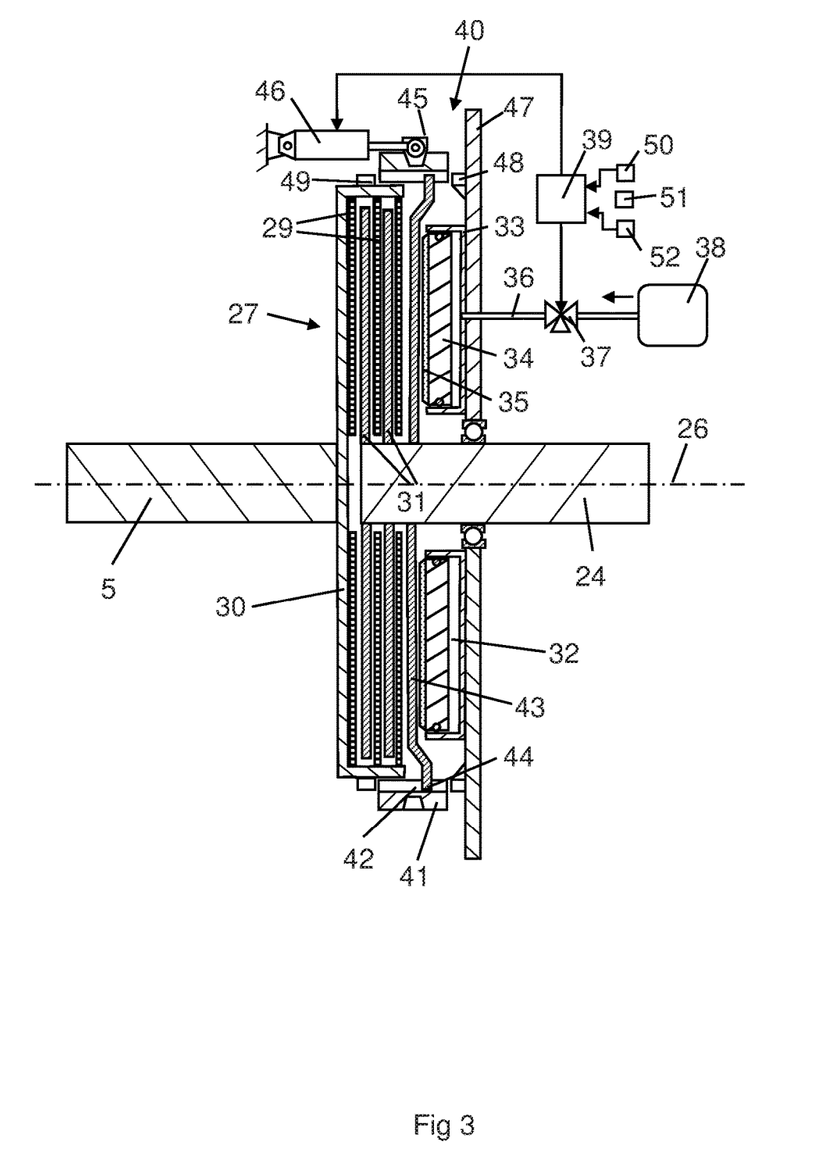
FIG. 3 shows the device when the switch mechanism is in a neutral position.
Figure 4:
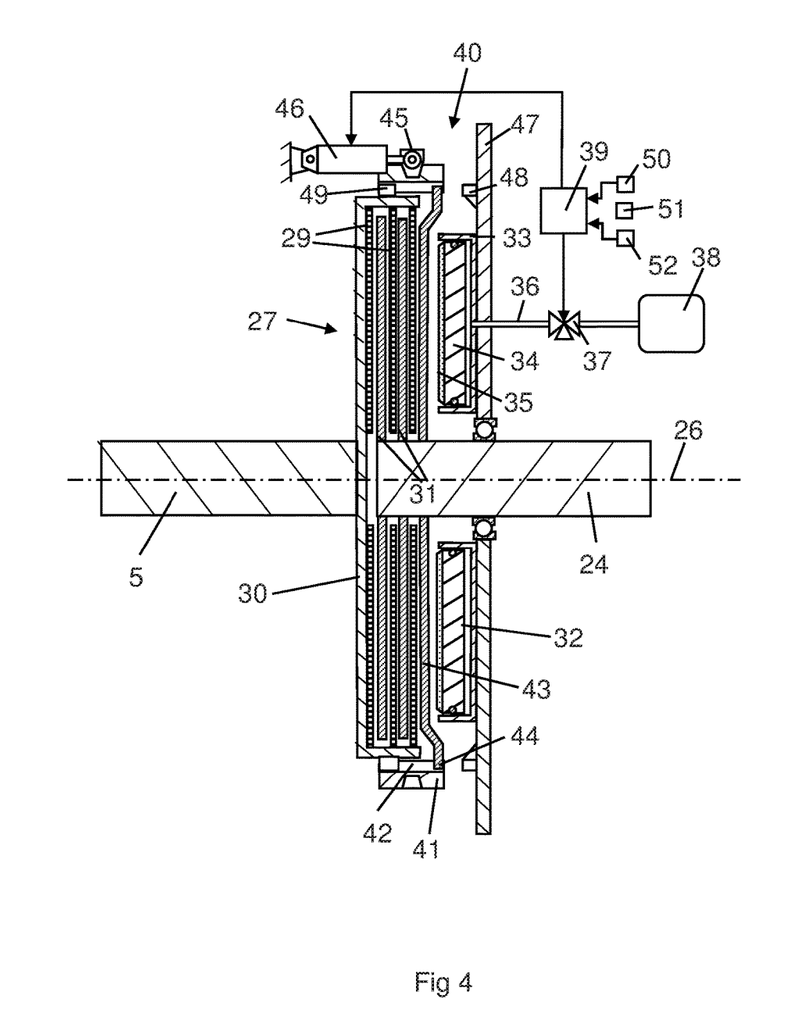
FIG. 4 shows the device when the switch mechanism is in a second position.

FIGS. 2 to 4 show the device 25 more in detail. Thus, the device 25 is arranged in an area of the gearbox 2 located in the vicinity of an end portions of the counter shaft 5 and an end portion of the PTO shaft 24. The device 25 comprises a clutch mechanism 27. The clutch mechanism 27 comprises a primary set of friction discs 29 connected to the counter shaft 5 and a secondary set of friction discs 31 connected to the PTO shaft 24. The friction discs 29, 31 are arranged so that every other friction disc forms part of the primary set and every secondary friction disc forms part of the secondary set. The primary set of friction discs 29 comprises, at an outer periphery, axial guide portions to be in engagement with axial grooves of an annular support member 30. The support member 30 is fixedly connected to the counter shaft 5. Thereby, the primary set of friction discs 29 are rotationally locked to the counter shaft 5 but movably arranged in an axial direction in relation to the support member 30 and the counter shaft 5. The secondary set of friction discs 31 comprises axial guide portions at an inner periphery to be in engagement with axial grooves of the PTO shaft 24. Thereby, the secondary set of friction discs 31 are rotationally locked to the PTO shaft 24 but movably arranged in an axial direction in relation to the PTO shaft 24. Thus, the primary set of friction discs 29 rotate at the same speed as the counter shaft 5 and the secondary set of friction discs 31 rotate at the same speed as the PTO shaft 24.

The clutch mechanism 27 comprises a pneumatically activated clutch actuator 32. The clutch actuator 32 comprises an annular housing 33 including a correspondingly shaped piston 34. The piston 34 is rotationally locked in the housing 34. An outer surface of the piston 34 is provided with a fixedly arranged lining 35. Alternatively, the lining 35 may be a separate part of the piston 34. In this case, the lining 35 is to be rotationally locked. The lining 35 may be a rotationally locked disc-shaped member. Compressed air is supplied to an inner space of the housing 33 by means of at least one compressed air line 36. The compressed air line 36 comprises a three way valve 37 by which the inner space of the housing 33 is connectable to a compressed air source 38 or ambient air. A control unit 39 controls the tree way valve 37 and thus the supply of compressed air to the clutch actuator 32.

The device 25 comprises further a switch mechanism 40. The switch mechanism 40 comprises an annular coupling sleeve 41 comprising a teeth portion 42 at an inner periphery. The switch mechanism 40 comprises a coupling disc 43 comprising a teeth portion 44 at an outer periphery to be in constant engagement with the teeth portion 42 of the coupling sleeve 41. The teeth portions 42, 44 comprise axially directed teeth in relation to the common rotary axis 26. Thus, the coupling sleeve 41 is movably arranged in an axial direction in relation to the coupling disc 43. The coupling disc 43 comprises axial guide portions at an inner periphery to be in engagement with axial grooves of the PTO shaft 24. Thereby, the coupling disc 43 is rotationally locked to the PTO shaft 24 but movably arranged in an axial direction in relation to the PTO shaft 24. Consequently, the coupling sleeve 41, the coupling disc 43 and the PTO shaft 24 rotates with the same speed.

The coupling sleeve 41 comprises a circular recess at an outer periphery configured to receive a guiding element 45. A pneumatic switch actuator 46 is configured to move the guiding element 45 and thus the coupling sleeve 41 in an axial direction in relation to the PTO shaft 24. The teeth portion 42 of the coupling sleeve 41 has a width such it will not get out of engagement with the teeth portion 44 of the coupling disc 43 during said axial movements. The control unit 39 controls the activation of the switch actuator 46. The PTO shaft 24 extends through an opening in a stationary wall 47 in the gearbox 2. The stationary wall 47 comprises an annular teeth portion 48. The support member 30 is also provided with a teeth portion 49. The teeth portion 44 of the coupling disc 43, the teeth portions 48 of the stationary wall 47 and the teeth portion 49 of the support member 30 are arranged at a corresponding radial distance from the rotary axis 26 as the teeth portion 42 of the coupling sleeve 41. The control unit 39 receives information from a first 50 sensor about the speed of the main shaft 10, from a second sensor 51 about the speed of the counter shaft 5 and from a third sensor 52 about the speed of the PTO shaft 24. Alternatively, the control unit 39 has access to stored information of the braking time of the PTO shaft 24. In this case, the third sensor 52 can be excluded.

FIG. 2 shows the switch mechanism 40 when it has moved the coupling sleeve 41 in an axial direction to a first position. In the first position, the teeth portion 44 of the coupling sleeve 41 provides a rotationally fixed connection to the teeth portion 48 of the stationary wall 47. Thus, the coupling sleeve 41 is stationary in the first position as well as the coupling sleeve 41 and the PTO shaft 24. The teeth portion 42 of the coupling sleeve 41 is located at an axial distance from the teeth portion 49 of the support member 30. Thus, the counter shaft 5 is able to rotate freely in relation to the stationary coupling sleeve 41 and the stationary PTO shaft 24. In the first position, the vehicle 1 is driven with the PTO in an inactive state.

When an upshift process is to be performed in the gearbox 2, the speed of the counter shaft 5 has to be braked since the secondary gearwheel in the gearwheel pair to be engaged rotates with a higher speed than the main shaft 10. The control unit 39 sets the three way valve 37 in a position in which compressed air is supplied from the compressed air source 38, via the compressed air line 36, to the clutch actuator 32. The supplied compressed air provides a displacement of the piston 34 and the lining 35. The lining 35 comes in contact with a side surface of the coupling disc 43. The following axial movement of the piston 34 and the lining 35 moves the coupling disc 43 in an axial direction toward the friction discs 29, 31. The axial movement of the piston 34 and the lining 35 continue until the friction discs 29, 31 have been pressed together. The friction discs 31 are in a non-rotatable state since the PTO shaft 24 is rotationally locked. Consequently, the static discs 31 provide a braking action of the friction discs 29 which rotates with the same speed as the counter shaft 5. The control unit 39 receives substantially continuously information from the first sensor 50 of the speed of the main shaft 10 and from the second sensor 51 about the speed of the counter shaft 5. When the counter shaft 5 has reached a speed in which the secondary gearwheel 11-13 of the gearwheel pair to be engaged rotates with a substantially synchronous speed with the main shaft 10, the control unit 39 sets the three way valve 37 in a position in which the clutch actuator 32 is connected to ambient air. The piston 34 is retracted and the friction discs 29, 31 is moved in an axial direction out of engagement with each other. The control unit 39 activates a corresponding locking unit 14-16 which provides a rotational locking of said secondary gearwheel 11-13 on the main shaft 10. When a downshift process in the gearbox 2 is to be performed, the speed of the counter shaft 5 has to be accelerated since the secondary gearwheel 11-13 in the gearwheel pair to be engaged rotates with a lower speed than the main shift 10. In this case, the control unit 39 activates the engine such that it accelerates the counter shaft 5 until the secondary gearwheel 11-13 to be engaged receives a synchronous speed with the main shaft 10 whereupon a lock unit 14-16 provides a rotational locking of said secondary gear 11-13 on the main shaft 10.

When the PTO is to be activated, the vehicle 1 is accelerated to a speed at which the PTO is to be used. Thereafter, the control unit 39 activates the switch actuator 46 such that it moves the coupling sleeve 41 from the first position to a neutral position which is shown in FIG. 3. The teeth portion 42 of the coupling sleeve 41 is moved out of engagement with the teeth portion 48 of the stationary wall 47. The coupling disc 43 and the PTO shaft 24 are now able to rotate. The control unit 39 sets the three way valve 37 in a position in which compressed air is supplied from the compressed air source 38, via the compressed air line 36, to the clutch actuator 32. The supply of the compressed air provides an axial movement of the piston 34 and the lining 35 which moves the friction discs 29, 31 of the primary set and the secondary set together. The friction discs 29 of the primary set rotates with the speed of the counter shaft 5 and the friction discs 31 of the secondary set as well as the PTO shaft 24 are initially stationary. The contact between the friction discs 29, 31 results in an acceleration of the friction discs 31 of the secondary set and the PTO shaft 24 up to a synchronous speed with the friction discs 29 of the primary set and the counter shaft 5. The control unit 39 receives substantially continuously information from the second sensor 51 of the speed of the counter shaft 10 and from the third sensor 52 about the speed of the PTO shaft 24.

When the PTO shaft 24 reaches a synchronous speed with the counter shaft 5, the control unit 39 activates the switch actuator 46 such that it moves the guiding element 45 and the coupling sleeve 41 to a second position, which is shown in FIG. 4. In the second position, the coupling sleeve 41 provides a rotational fixed connection between the coupling disc 43 and the support member 30. Since the coupling disc 43 is rotationally fixedly connected on the PTO shaft 24 and the support member 30 is rotationally fixedly connected to the counter shaft 5, the coupling sleeve 41 provides a rotationally fixed connection between the counter shaft 5 and the PTO shaft 24 in the second position. In the second position, the PTO shaft 24 is driven by the counter shaft 5. At the same time or just before the coupling sleeve 41 is moved to the second position, the control unit 39 connects the clutch actuator 32 to ambient air such that the piston 34 is retracted in an axial direction and the friction discs 29, 31 are moved in an axial direction out of engagement with each other.

When the PTO is to be inactivated, the control unit 39 activates the switch actuator 45 such that it moves guiding element 45 and the coupling disc 43 from the second position to the neutral position. The PTO shaft 24 is now disconnected from the counter shaft 5. The speed of the PTO shaft 24 is gradually reduced by drag losses. The control unit 39 receives information from the second sensor 52 about the speed of the PTO shaft 24. When the speed of the PTO shaft 24 has ceased, the switch actuator 46 is activated such that it moves the coupling sleeve 41 to the first position. Alternatively, the control unit 39 activates the clutch actuator 32 such that it moves the lining 35 to a position in which it comes in contact with the coupling disc 43 but not to a position in which the friction discs 29, 31 are pressed together. In that case, the clutch actuator 32 will stop the rotary speed of the coupling disc 43 and the PTO shaft 24. When the rotary movement of the PTO shaft 24 has ceased, the control unit 39 activates the switch actuator 46 such that it moves the coupling sleeve 41 to the first position. According to a further alternative, the teeth portion 42 of the coupling sleeve 41 and the teeth portion 48 of the stationary wall 47 are provided with teeth making it possible to engage the teeth portions 42, 48 with a remaining speed difference. In this case, the switch actuator 46 moves the coupling sleeve 41 to the first position when the rotary speed of the PTO shaft 24 has been reduced to a speed below a predetermined value.

The invention is not restricted to the described embodiment but may be varied freely within the scope of the claims.

The invention claimed is:

1. A device for a gearbox, where the gearbox comprises a main shaft, a counter shaft, a plurality of gearwheel pairs which each comprises a primary gearwheel arranged on the counter shaft and a secondary gearwheel arranged on the main shaft and a PTO shaft, wherein the device comprises:

a switch mechanism movably arranged to a first position in which the PTO shaft is disconnected from the counter shaft in a non-rotatable state and to a second position in which the PTO shaft is rotationally fixedly connected to the counter shaft, wherein the that switch mechanism is movably arranged to a neutral position in which the PTO shaft is disconnected from the counter shaft in a rotatable state; and a clutch mechanism able to provide a clutching connection between the counter shaft and the PTO shaft when the switch mechanism is in the first position and in the neutral position.

2. A device according to claim 1, wherein the device is arranged in an area in the vicinity of an end portion of the counter shaft and an end portion of the PTO shaft.

3. A device according to claim 1, wherein the device is arranged in an area in the vicinity of the end portions of a counter shaft and a PTO shaft which are coaxially arranged in the gearbox.

4. A device according to claim 1, wherein the clutch mechanism comprises:

at least one primary friction disc rotationally fixedly connected to the counter shaft;

at least one secondary friction disc rotationally fixedly connected to the PTO shaft; and a clutch actuator configured to move the primary friction disc and the secondary friction disc against each other in order to establish a clutching connection between the counter shaft and the PTO shaft.

5. A device according to claim 4, wherein a coupling disc is arranged between the friction discs and the clutch actuator.

6. A device according to claim 4, wherein the primary friction disc and/or the second friction disc are movably arranged in an axial direction in relation to their respective axes.

7. A device according to claim 1, wherein the switch mechanism comprises a coupling sleeve which is movably arranged to the first position, the second position and the neutral position.

8. A device according to claim 7, wherein said coupling sleeve is, in the neutral position, rotationally fixedly connected to the PTO shaft and disconnected from the counter shaft and the stationary component.

9. A device according to claim 7, wherein said coupling sleeve is rotationally fixedly connected to the PTO shaft via a first component.

10. A device according to claim 9, wherein said first component is a coupling disc rotationally fixedly connected to the PTO shaft and provided with a teeth portion at an outer periphery to be in constant engagement with a teeth portion of the coupling sleeve.

11. A device according to claim 9, wherein the coupling sleeve is configured to establish a rotationally fixed connection between said first component and a second stationary component in the gearbox in the first position.

12. A device according to claim 9, wherein said coupling sleeve is configured to establish a rotationally fixed connection between said first component and a third component which is rotationally fixedly connected to the counter shaft in the second position.

13. A device according to claim 12, wherein the third component is a support member for the primary friction disc, wherein the support member is provided with a teeth portion at an outer periphery to be engageable with a teeth portion of the coupling sleeve.

14. A gearbox comprising a main shaft;

a counter shaft;

a plurality of gearwheel pairs which each comprises a primary gearwheel arranged on the counter shaft and a secondary gearwheel arranged on the main shaft and a PTO shaft; and a device comprising:

a switch mechanism movably arranged to a first position in which the PTO shaft is disconnected from the counter shaft in a non-rotatable state and to a second position in which the PTO shaft is rotationally fixedly connected to the counter shaft, wherein the that switch mechanism is movably arranged to a neutral position in which the PTO shaft is disconnected from the counter shaft in a rotatable state; and a clutch mechanism able to provide a clutching connection between the counter shaft and the PTO shaft when the switch mechanism is in the first position and in the neutral position.

15. A gearbox according to claim 14, wherein the device is arranged in an area in the vicinity of an end portion of the counter shaft and an end portion of the PTO shaft.

16. A gearbox according to claim 14, wherein the device is arranged in an area in the vicinity of the end portions of a counter shaft and a PTO shaft which are coaxially arranged in the gearbox.

17. A gearbox according to claim 14, wherein the clutch mechanism comprises:

at least one primary friction disc rotationally fixedly connected to the counter shaft;

at least one secondary friction disc rotationally fixedly connected to the PTO shaft; and a clutch actuator configured to move the primary friction disc and the secondary friction disc against each other in order to establish a clutching connection between the counter shaft and the PTO shaft.

18. A vehicle comprising:

a gearbox comprising:

a main shaft;

a counter shaft;

a plurality of gearwheel pairs which each comprises a primary gearwheel arranged on the counter shaft and a secondary gearwheel arranged on the main shaft and a PTO shaft; and a device comprising:

a switch mechanism movably arranged to a first position in which the PTO shaft is disconnected from the counter shaft in a non-rotatable state and to a second position in which the PTO shaft is rotationally fixedly connected to the counter shaft, wherein the that switch mechanism is movably arranged to a neutral position in which the PTO shaft is disconnected from the counter shaft in a rotatable state; and a clutch mechanism able to provide a clutching connection between the counter shaft and the PTO shaft when the switch mechanism is in the first position and in the neutral position.

19. A vehicle according to claim 18, wherein the device is arranged in an area in the vicinity of an end portion of the counter shaft and an end portion of the PTO shaft.

20. A vehicle according to claim 18, wherein the device is arranged in an area in the vicinity of the end portions of a counter shaft and a PTO shaft which are coaxially arranged in the gearbox.

\* \* \* \* \*